(12) United States Patent
Chin et al.

(10) Patent No.: US 8,948,126 B2
(45) Date of Patent: Feb. 3, 2015

(54) SCHEDULING TDD-LTE MEASUREMENT IN TD-SCDMA SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 12/977,546

(22) Filed: Dec. 23, 2010

(65) Prior Publication Data

US 2012/0163198 A1 Jun. 28, 2012

(51) Int. Cl.
*H04W 4/00* (2009.01)
*H04J 3/00* (2006.01)
*H04W 36/00* (2009.01)
*H04W 36/14* (2009.01)

(52) U.S. Cl.
CPC .......... *H04W 36/0088* (2013.01); *H04W 36/14* (2013.01)
USPC .......................................... 370/331; 370/280

(58) Field of Classification Search
CPC .................. H04W 36/0088; H04W 36/0044; H04W 36/0077; H04W 36/022; H04W 36/077
USPC ................................................. 370/280, 331
See application file for complete search history.

(56) References Cited

U.S. PATENT DOCUMENTS

| | | | |
|---|---|---|---|
| 2003/0117980 A1* | 6/2003 | Kim et al. ..................... 370/332 |
| 2004/0002334 A1* | 1/2004 | Lee et al. ...................... 455/436 |
| 2004/0151143 A1* | 8/2004 | Abdesselem et al. .......... 370/336 |
| 2006/0223557 A1 | 10/2006 | Manohar |
| 2007/0097914 A1* | 5/2007 | Grilli et al. ..................... 370/329 |
| 2008/0095195 A1* | 4/2008 | Ahmadi et al. ................ 370/478 |
| 2008/0189970 A1* | 8/2008 | Wang et al. ...................... 33/701 |
| 2009/0280802 A1 | 11/2009 | Chin et al. |
| 2010/0074218 A1* | 3/2010 | Cai et al. ........................ 370/331 |
| 2010/0284289 A1* | 11/2010 | Suo et al. ....................... 370/252 |
| 2011/0007657 A1* | 1/2011 | Kazmi et al. .................. 370/252 |
| 2011/0070869 A1* | 3/2011 | Ryu ........................... 455/412.1 |
| 2011/0190011 A1* | 8/2011 | Choi et al. ..................... 455/466 |

(Continued)

FOREIGN PATENT DOCUMENTS

CN 1806455 A 7/2006
EP 2034628 A1 3/2009

(Continued)

OTHER PUBLICATIONS

3GPP TS 36.300 V9.1.0 (Sep. 2009) Technical Specification 3rd Generation Partnership Project Stage 2, Release 9.*

(Continued)

*Primary Examiner* — Noel Beharry
*Assistant Examiner* — Joe Combs
(74) *Attorney, Agent, or Firm* — Kristine U. Ekwueme

(57) ABSTRACT

Certain aspects of the present disclosure propose techniques for performing a time division duplex-long term evolution (TDD-LTE) measurement in a time division synchronous code division multiple access (TD-SCDMA) system. Certain aspects provide a method that generally includes obtaining measurements of downlink (DL) transmission from a base station (BS) of a second radio access technology (RAT), maintaining uplink (UL) transmission with a BS of a first RAT while obtaining the measurements, and performing network acquisition operations with the BS of the second RAT based on the measurements.

46 Claims, 9 Drawing Sheets

(56) References Cited

U.S. PATENT DOCUMENTS

| | | | |
|---|---|---|---|
| 2011/0207450 A1* | 8/2011 | Siomina et al. | 455/422.1 |
| 2011/0207485 A1* | 8/2011 | Dimou et al. | 455/507 |
| 2011/0228711 A1* | 9/2011 | Du et al. | 370/280 |
| 2012/0020310 A1* | 1/2012 | Ji et al. | 370/329 |
| 2012/0164948 A1* | 6/2012 | Narasimha et al. | 455/63.1 |
| 2012/0307670 A1* | 12/2012 | Kazmi et al. | 370/252 |
| 2013/0059610 A1* | 3/2013 | Siomina et al. | 455/456.6 |
| 2013/0176997 A1* | 7/2013 | Tian et al. | 370/336 |
| 2013/0201892 A1* | 8/2013 | Holma et al. | 370/311 |

FOREIGN PATENT DOCUMENTS

| | | |
|---|---|---|
| EP | 2048898 A1 | 4/2009 |
| WO | WO03043237 A1 | 5/2003 |
| WO | WO2004091231 A1 | 10/2004 |
| WO | WO2008043560 A1 | 4/2008 |

OTHER PUBLICATIONS

TD-SCDMA White Paper—White Paper—TD-SCDMA: the Solution for TDD bands—Siemens SLC Mar. 2004 (Siemens).*
3GPP TS 36.214 V8.6.0 (Mar. 2009) Technical Specification 3rd Generation Partnership Project—Physical layer—Measurements—Release 8 (3GPP Measurements).*
3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 10), 3GPP TS 36.300 VIO.2.0 (Dec. 2010), Dec. 21, 2010, XP002656255.
International Search Report and Written Opinion—PCT/US2011/025120, International Search Authority—European Patent Office—Aug. 17, 2011.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

SCHEDULING TDD-LTE MEASUREMENT IN TD-SCDMA SYSTEMS

BACKGROUND

1. Field

Certain aspects of the present disclosure generally relate to wireless communications and, more particularly, to performing time division duplex-long term evolution (TDD-LTE) measurement in a time division synchronous code division multiple access (TD-SCDMA) system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Division Multiple Access (TD-CDMA), and Time Division—Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes sending, from a base station of a first radio access technology (RAT), a command to a user equipment (UE), wherein the command instructs the UE to obtain measurements of downlink (DL) transmission from a BS of a second RAT; and maintaining uplink (UL) transmission with the UE while the UE obtains the measurements.

In an aspect of the disclosure, an apparatus for wireless communications is provided. The apparatus generally includes means for obtaining measurements of downlink (DL) transmission from a base station (BS) of a second radio access technology (RAT); means for maintaining uplink (UL) transmission with a BS of a first RAT while obtaining the measurements; and means for performing network acquisition operations with the BS of the second RAT based on the measurements.

In an aspect of the disclosure, an apparatus for wireless communications is provided. The apparatus generally includes at least one processor and a memory coupled to the at least one processor. The at least one processor is typically adapted to obtain measurements of downlink (DL) transmission from a base station (BS) of a second radio access technology (RAT); maintain uplink (UL) transmission with a BS of a first RAT while obtaining the measurements; and perform network acquisition operations with the BS of the second RAT based on the measurements.

In an aspect of the disclosure, a computer-program product is provided. The computer-program product generally includes a computer-readable medium having code for obtaining measurements of downlink (DL) transmission from a base station (BS) of a second radio access technology (RAT); maintaining uplink (UL) transmission with a BS of a first RAT while obtaining the measurements; and performing network acquisition operations with the BS of the second RAT based on the measurements.

In an aspect of the disclosure, a method for wireless communications is provided. The method generally includes obtaining measurements of downlink (DL) transmission from a base station (BS) of a second radio access technology (RAT); maintaining uplink (UL) transmission with a BS of a first RAT while obtaining the measurements; and performing network acquisition operations with the BS of the second RAT based on the measurements.

In an aspect of the disclosure, an apparatus for wireless communications is provided. The apparatus generally includes means for sending, from a base station (BS) of a first radio access technology (RAT), a command to a user equipment (UE), wherein the command instructs the UE to obtain measurements of downlink (DL) transmission from a BS of a second RAT; and means for maintaining uplink (UL) transmission with the UE while the UE obtains the measurements.

In an aspect of the disclosure, an apparatus for wireless communications is provided. The apparatus generally includes at least one processor and a memory coupled to the at least one processor. The at least one processor is typically adapted to send, from a base station (BS) of a first radio access technology (RAT), a command to a user equipment (UE), wherein the command instructs the UE to obtain measurements of downlink (DL) transmission from a BS of a second RAT; and maintain uplink (UL) transmission with the UE while the UE obtains the measurements.

In an aspect of the disclosure, a computer-program product is provided. The computer-program product generally includes a computer-readable medium having code for sending, from a base station (BS) of a first radio access technology (RAT), a command to a user equipment (UE), wherein the command instructs the UE to obtain measurements of downlink (DL) transmission from a BS of a second RAT; and maintaining uplink (UL) transmission with the UE while the UE obtains the measurements.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates an example list of downlink/uplink (DL/UL) configurations in a frame in the TDD-LTE standard in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
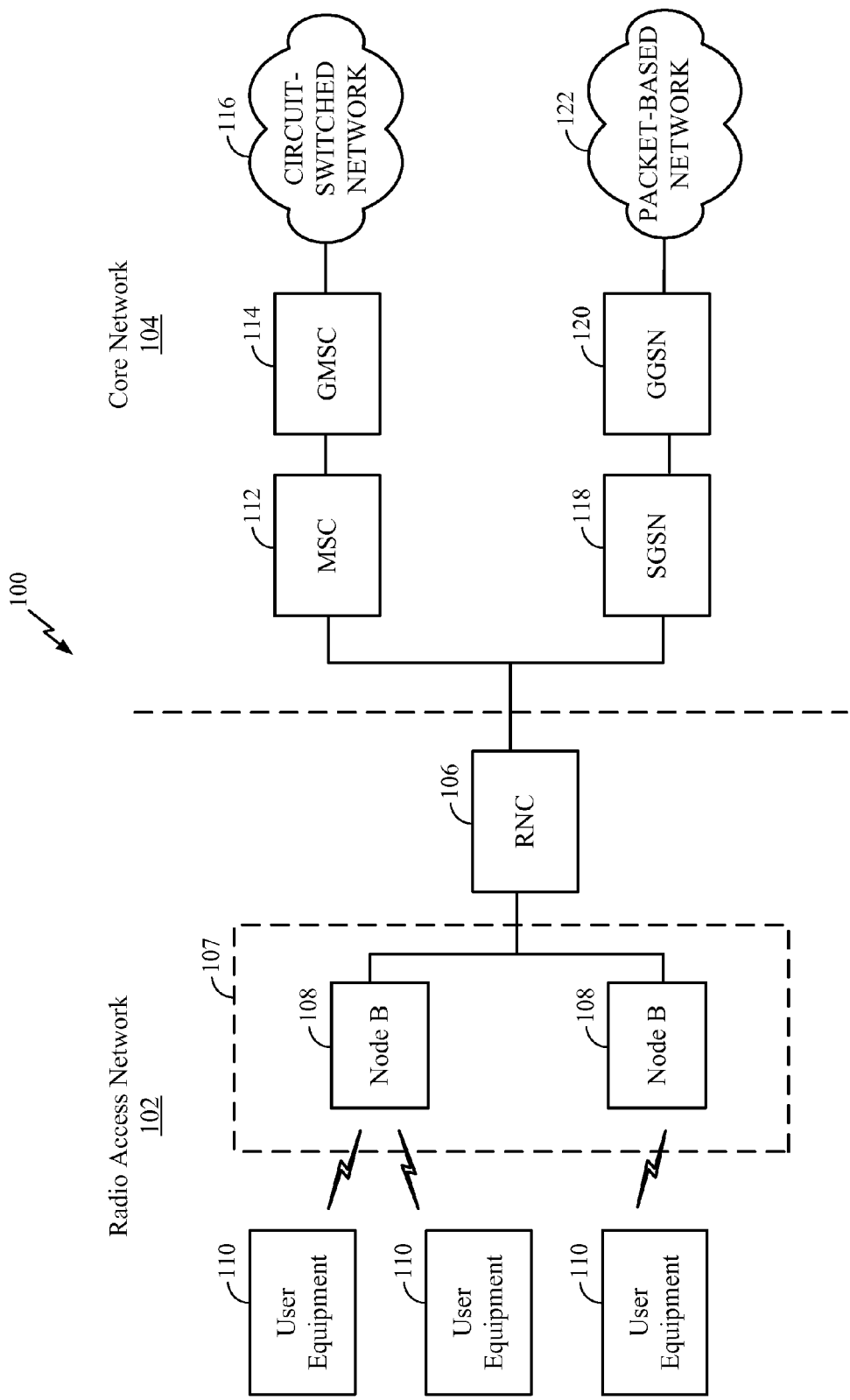
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
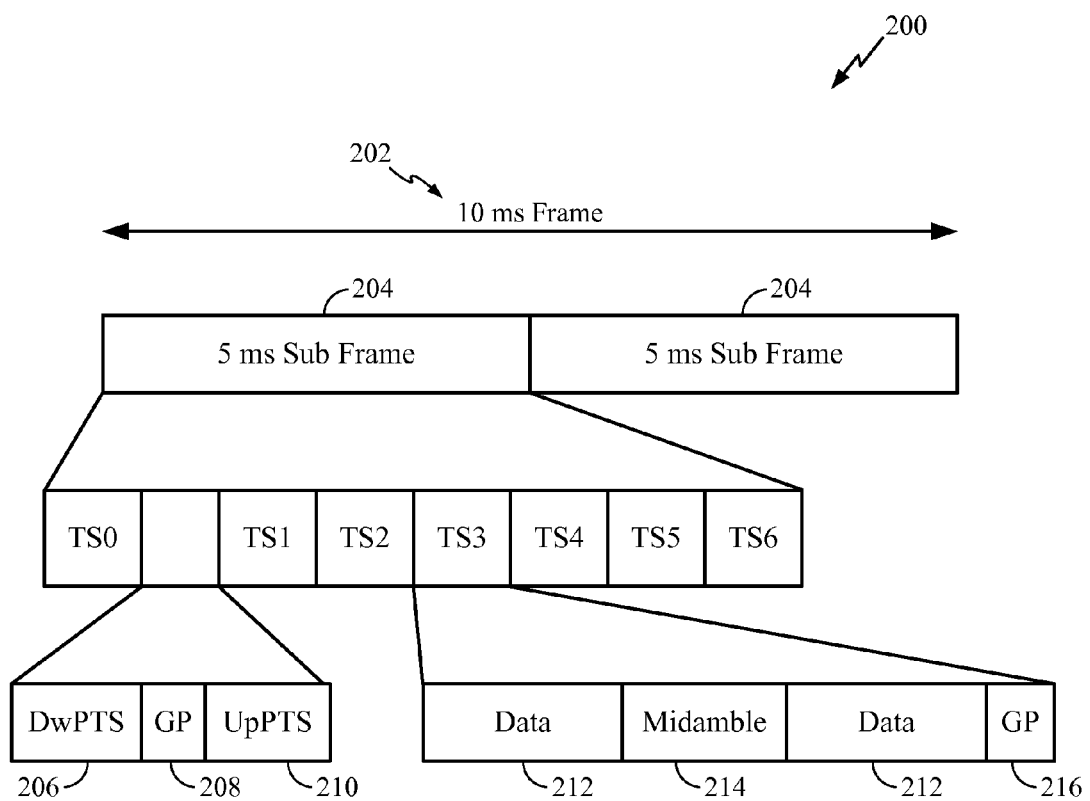
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. TS0 may be used to transmit overhead channels only, including a primary common control physical channel (P-CCPCH).

Figure 3:
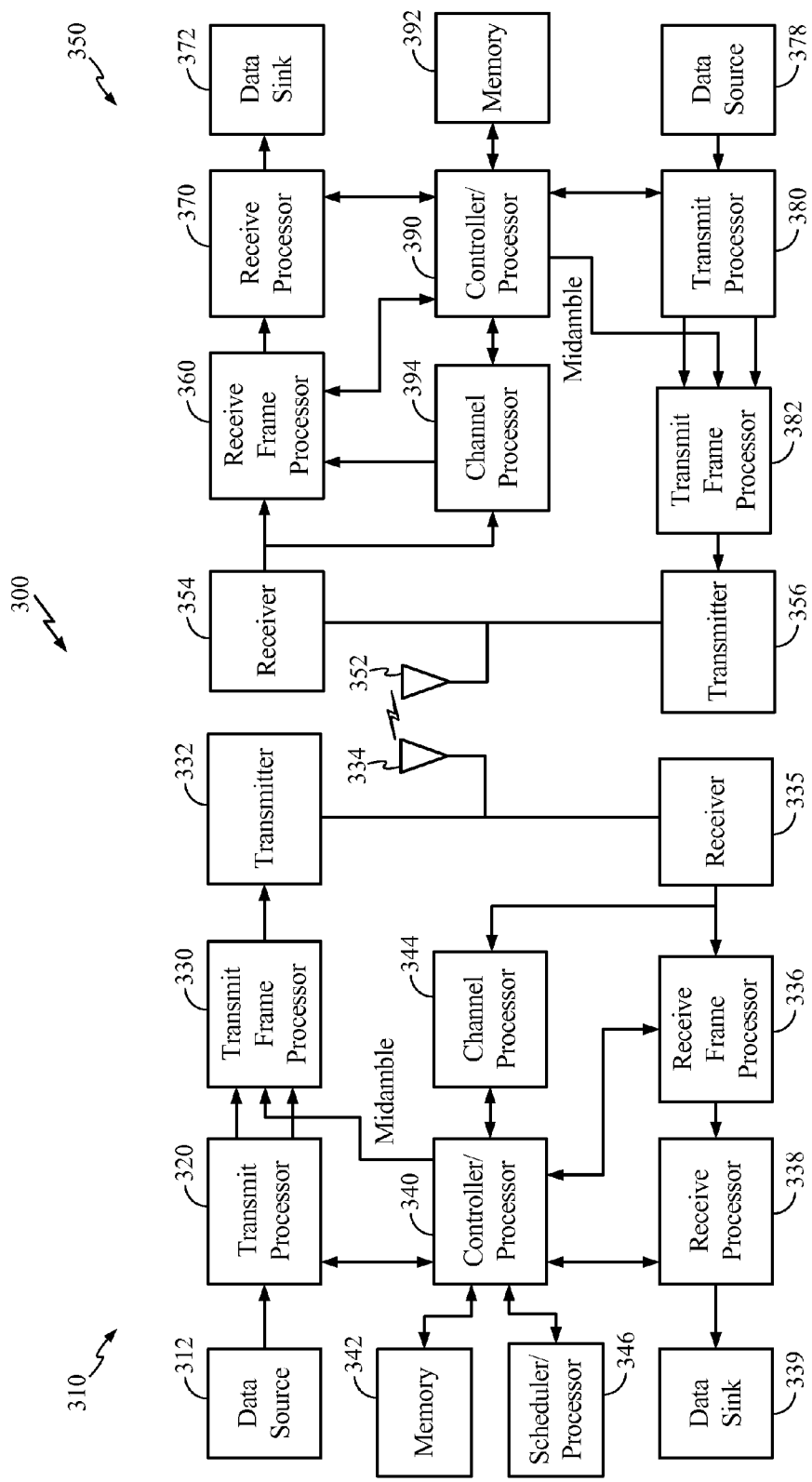
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
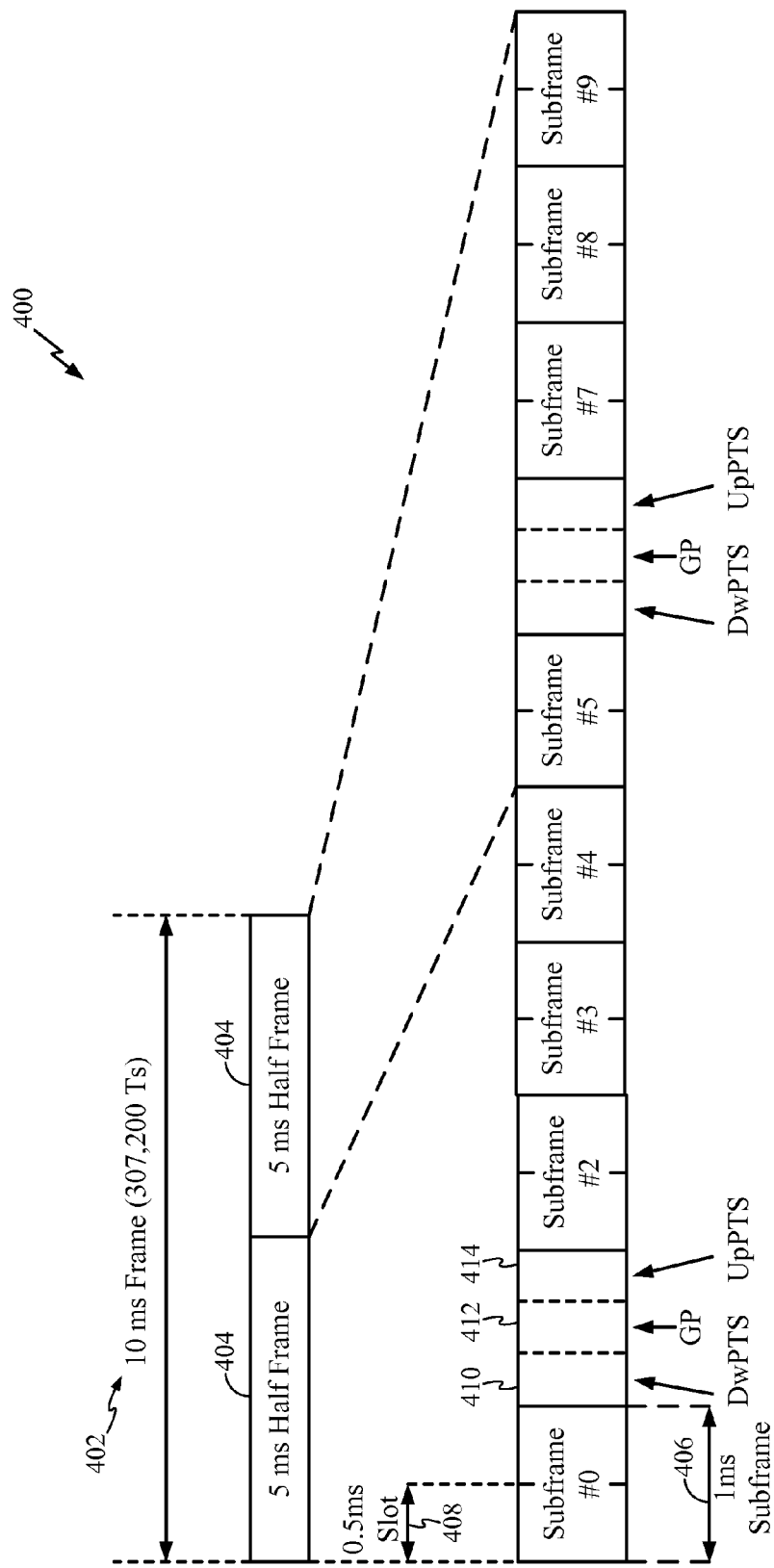
FIG. 4 is a block diagram conceptually illustrating an example of a frame structure in a telecommunications system in accordance with certain aspects of the present disclosure.

FIG. 4 shows a frame structure 400 for a Time Division Duplex Long Term Evolution (TDD-LTE) carrier. The TDD-LTE carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (S). Downlink subframes and uplink subframes may be divided into two 0.5 ms slots 408. Special subframes may be divided into a downlink pilot time slot (DwPTS) 410, a guard period (GP) 412, and an uplink pilot time slot (UpPTS) 414. Depending on the configuration, the duration of DwPTS, UpPTS, and GP may vary.

FIG. 5 illustrates an example list of the downlink/uplink configurations in a TDD-LTE frame 402 according to the LTE standard. In this table D, U, and S indicate Downlink, Uplink and Special subframes 406, respectively. The special subframe S may consist of DwPTS 410, GP 412, and UpPTS 414 fields. As illustrated, several DL/UL configurations for 5 ms switch point periodicity and 10 ms switch point periodicity may be chosen for an TDD-LTE frame 402. The configurations 0, 1, and 2 have two identical 5 ms half-frames 404 within a 10 ms TDD-LTE frame 402.

Scheduling TDD-LTE Measurement in TD-SCDMA Systems

Figure 6:
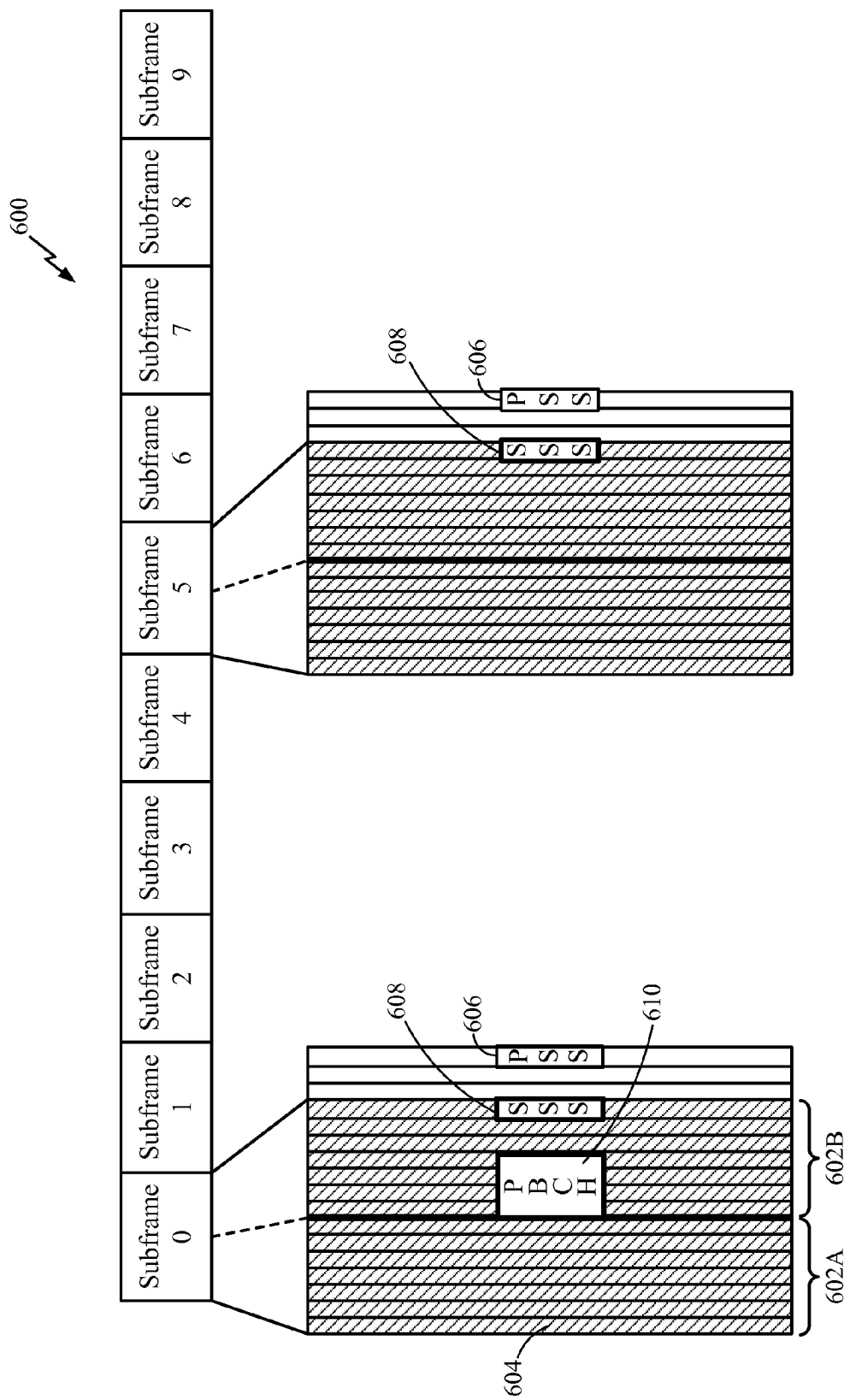
FIG. 6 illustrates an embodiment of an LTE frame with overhead signals in accordance with certain aspects of the present disclosure.

FIG. 6 illustrates the location of overhead signals in an exemplary LTE frame 600. LTE frame 600 may be divided into subframes 0-9. Each subframe may be further divided into two slots 602A and 602B. Slot 1 may be the second slot of subframe 0 and slot 11 may be the second slot of subframe 5. Each slot may be further divided into symbols 604. To acquire TDD-LTE, a UE may need to acquire a Primary Synchronization Signal (PSS) 606, a Secondary Synchronization Signal (SSS) 608, and a Physical Broadcast Channel (PBCH) 610 of the TDD-LTE system. These overhead signals may occupy the center 1.08 MHz (i.e., 6 resource blocks) of the transmission bandwidth. To transmit these overhead signals, the PSS 606 may be transmitted in the third symbol of subframes 1 and 6. The PSS 606 may be used to identify a cell index (0, 1, 2) and subframe timing. The SSS 608, which may be used to identify the cell identification (ID) group index (0, 1, . . . , 167) and frame timing, may be transmitted in the last symbol in slots 1 and 11. PBCH 610 may always be transmitted in slot 1, which may be the second slot of subframe 0. PBCH 610 may be used to identify an overall DL transmission bandwidth, a physical hybrid ARQ indicator channel (PHICH) configuration, and a System Frame Number (SFN).

TDD-LTE may be deployed in a manner such that the frame transmission may be synchronous at the BSs, and the frame boundary may be in sync with the TD-SCDMA system. Measurement of the TDD-LTE overhead signals may be required prior to handover from TD-SCDMA to TDD-LTE. The UE may be commanded by the TD-SCDMA base station to measure the overhead signals, including Reference Signal Received Power (RSRP) or Reference Signal Received Quality (RSRQ) of neighbor TDD-LTE cells and the UE may report the measurements to the TD-SCDMA to trigger handover.

To allow measurement on a TDD-LTE cell, the UE may need to acquire PSS 606, SSS 608, and PBCH 610 and measure the Reference Signal (RS). Accordingly, the UE may need to obtain the measurements of DL transmission from the TDD-LTE cell in slot 1 and the first 3 symbols of subframe 1, which may correspond to time interval 0.5~1.43 ms of the TDD-LTE frame 600. Further, the UE may need to obtain measurements in slot 11 and the first three symbols of subframe 6, which may correspond to time interval 5.92~6.43 ms of the TDD-LTE frame 600. This interval may be equivalent to TD-SCDMA slots TS0~TS1 of subframe 0, namely 0~1.625 ms and DwPTS~TS1 of subframe 1, namely 5.675~6.625 ms of the TD-SCDMA frame. The UE may measure the RS in any given slot.

For some embodiments, a TD-SCDMA network may not allocate the traffic channels on TS0 for the UE that needs to perform measurement of a TDD-LTE network. The UE may have DL and UL radio frequency (RF) chains that may be tuned independently. For example, the DL may operate on a frequency channel while the UL may operate on another frequency channel. The UE may tune DL from the TD-SCDMA system to the TDD-LTE system at, for example, TS0 and TS1 (i.e., first DL time slot of a subframe of the TD-SCDMA system). After performing the measurements, the UE may return to the TD-SCDMA network before the second DL time slot of the subframe, (e.g., TS3 or TS4), and stay through the rest of the subframe in TD-SCDMA. The UE may maintain UL transmission with the TD-SCDMA network while obtaining measurements of DL transmission from the TDD-LTE network.

Figure 7:
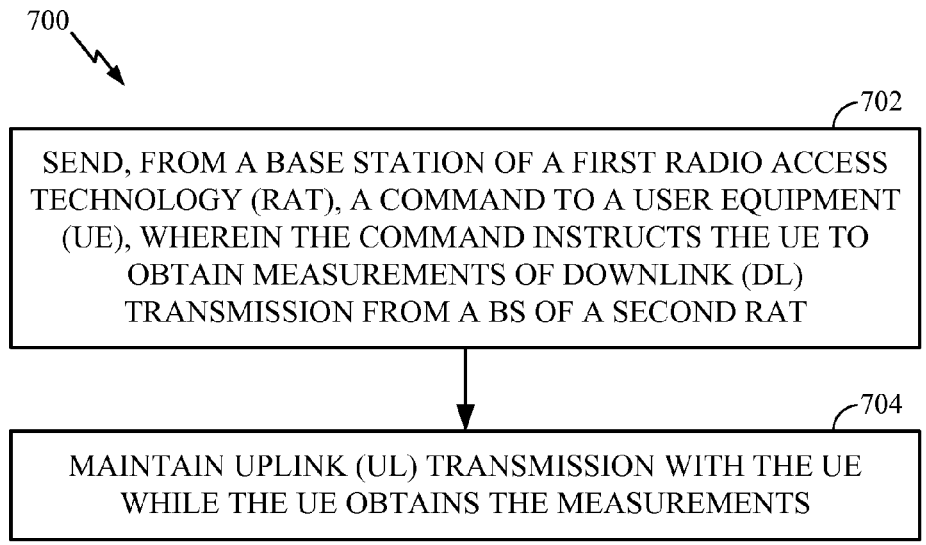
FIG. 7 illustrates example operations for maintaining UL transmissions with the UE while the UE obtains measurements in accordance with certain aspects of the present disclosure.

FIG. 7 illustrates example operations 700 in accordance with certain aspects of the present disclosure. The operations 700 may be performed, for example, by a BS of a first RAT. At 702, a BS of the first RAT may send a command to a UE, wherein the command instructs the UE to obtain measurements of downlink (DL) transmission from a BS of a second RAT. At 704, the BS of the first RAT may maintain uplink (UL) transmission with the UE while the UE obtains the measurements.

Figure 8:
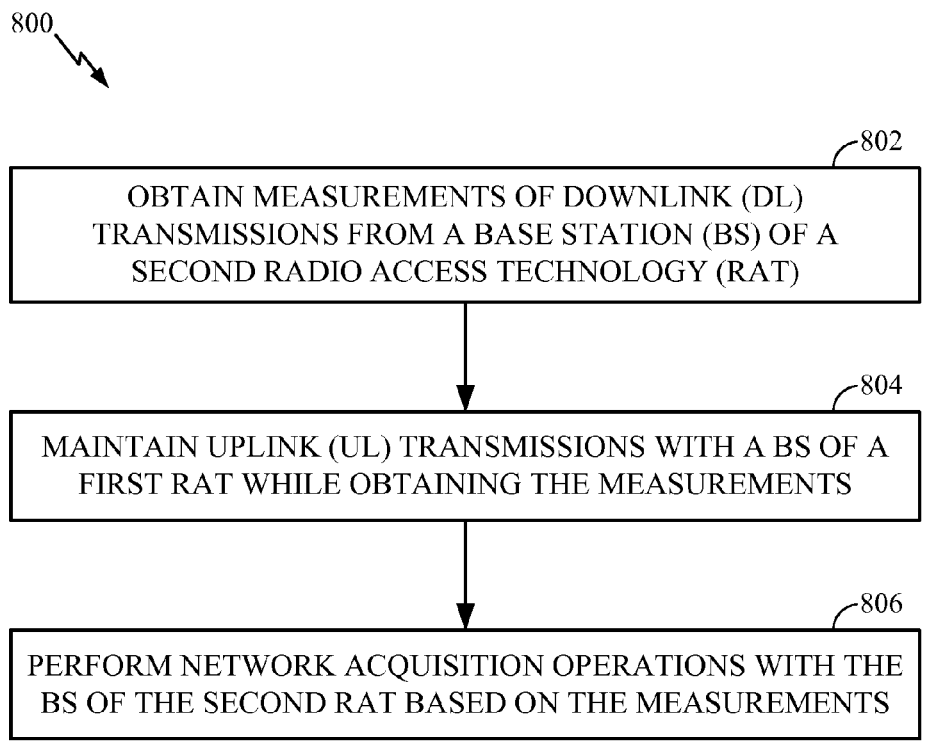
FIG. 8 illustrates example operations for performing network acquisition with the BS of a second RAT based on measurements taken, in accordance with certain aspects of the present disclosure.

FIG. 8 illustrates example operations 800 in accordance with certain aspects of the present disclosure. The operations 800 may be performed, for example, by a UE in taking effective measurement of TDD-LTE from a TD-SCDMA system. It may be assumed that both TDD-LTE and TD-SCDMA systems have a time-aligned frame boundary. At 802, a UE may obtain measurements of downlink (DL) transmission from a base station (BS) of a second radio access technology (RAT). At 804, the UE may maintain uplink (UL) transmission with a BS of a first RAT while obtaining the measurements. Upon obtaining the measurements, the UE may switch DL from the BS of the second RAT to the BS of the first RAT.

At 806, the UE may perform network acquisition operations with the BS of the second RAT based on the measurements.

Figure 9:
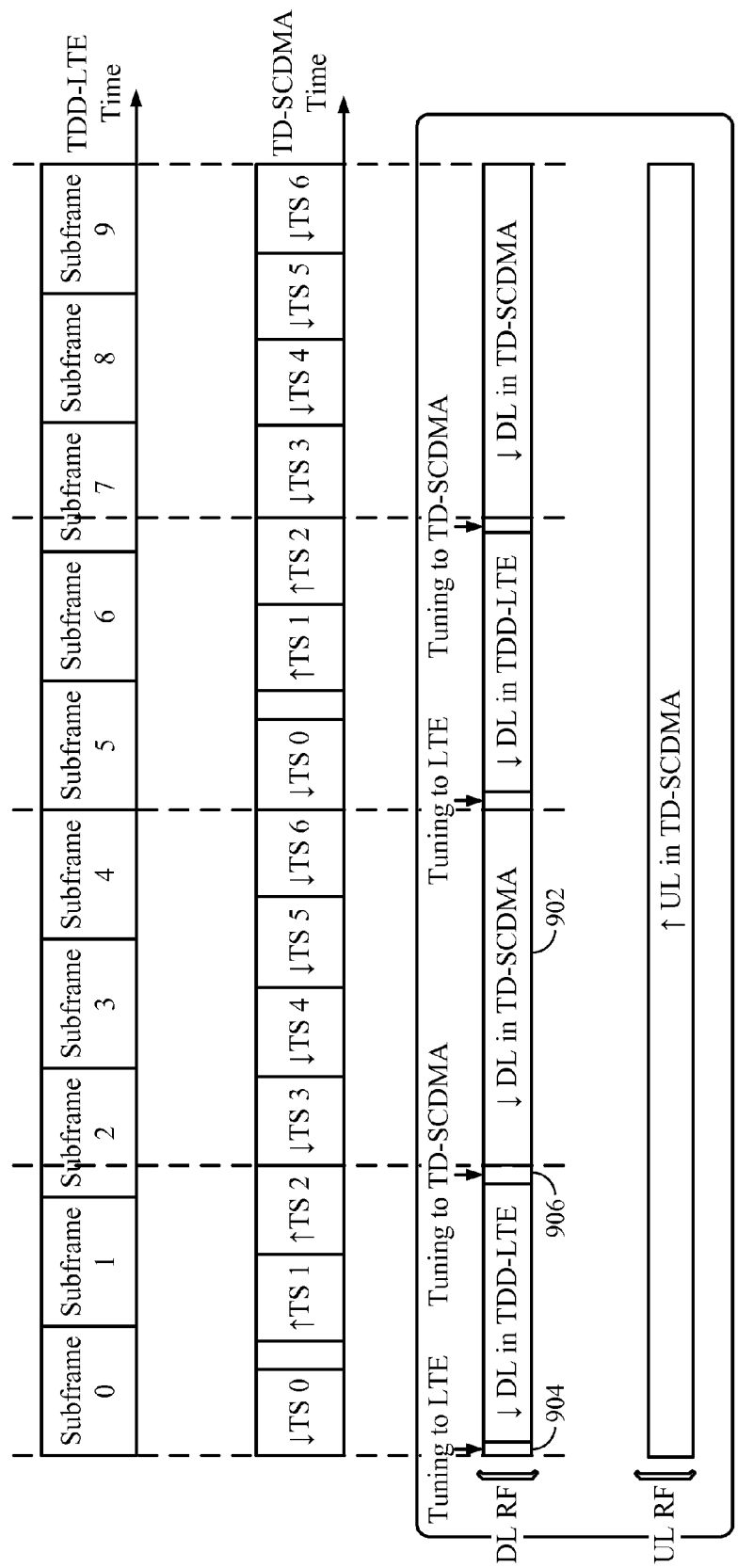
FIGS. 9-10 illustrate example timing diagrams of radio frequency (RF) tuning for measurement at a UE, in accordance with certain aspects of the present disclosure.
Figure 10:
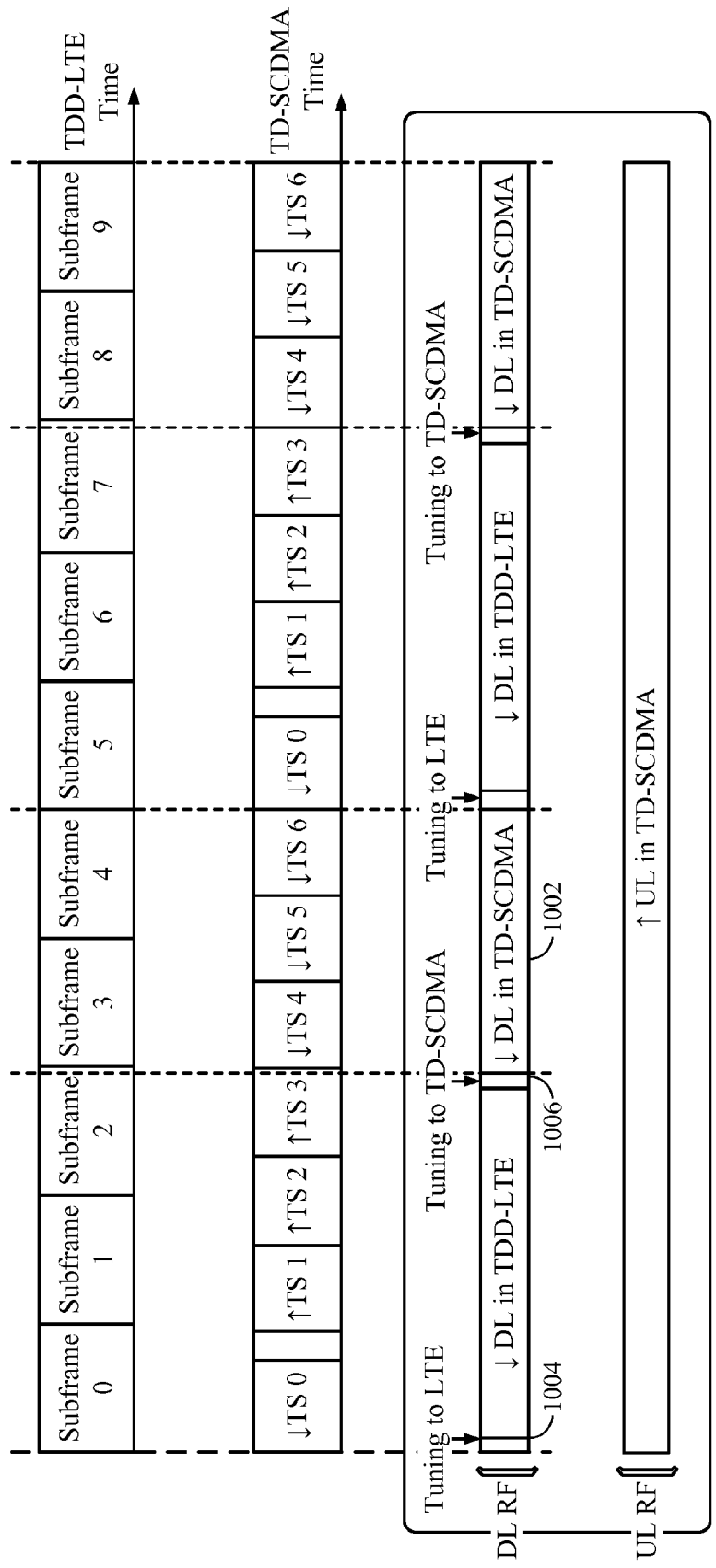

FIGS. 9-10 illustrate timing diagrams of the RF tuning for measurement at the UE. FIG. 9 illustrates a timing diagram assuming that the second DL time slot 902 starts at TS3. FIG. 10 illustrates a timing diagram of the RF tuning for measurement at the UE assuming that the second DL time slot 1002 starts at TS4. As illustrated in FIGS. 9-10, according to certain aspects of the present disclosure, there may be some tuning time 904, 1004 reserved for tuning to and acquiring TDD-LTE after the beginning of subframe 0 as well as tuning time 906, 1006 reserved for tuning to and acquiring TD-SCDMA prior to the second DL time slot. While the UE DL is in TDD-LTE, the UE may perform a series of tasks. The UE may acquire PSS and SSS on subframes 0, 1, 5, and 6, acquire PBCH on subframe 0, and measure the RS performance with the available slots.

As illustrated in FIG. 9, the UE may need to return to TD-SCDMA at TS3. If so, the UE may measure the RS performance in the second slot of subframe 0 or subframe 5 and all of subframe 1 or subframe 6. As illustrated in FIG. 10, the UE may need to return to TD-SCDMA at TS4. If so, the UE may measure the RS performance in the second slot of subframe 0, the second slot of subframe 5, all of subframe 1 or subframe 6, and the first slot of subframe 2 or subframe 7. As described herein certain aspects of the present disclosure may allow a UE to perform TDD-LTE measurements using TD-SCDMA transmission gaps and may facilitate handover from TD-SCDMA to TDD-LTE while the UE may still transmit or receive data normally.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
tuning away from a first radio access technology (RAT) to a second RAT during a first downlink time slot of a subframe of the first RAT, a frame boundary of the first RAT being aligned with a frame boundary of the second RAT;
obtaining measurements of downlink (DL) transmission from the second RAT including acquiring a primary synchronization signal (PSS), a secondary synchronization signal (SSS), and a physical broadcast channel (PBCH) of the second RAT;
tuning away from the second RAT to the first RAT before a transition from a last uplink time slot of the subframe of the first RAT to a second downlink time slot of the subframe of the first RAT; and
acquiring the second RAT based at least in part on the measurements.

2. The method of claim 1, wherein the first RAT comprises Time Division Synchronous Code Division Multiple Access (TD-SCDMA).

3. The method of claim 1, wherein the second RAT comprises Time Division Duplex Long Term Evolution (TDD-LTE).

4. The method of claim 1, wherein upon acquiring the PSS, the SSS, and the PBCH, measuring a reference signal received power (RSRP) and a reference signal received quality (RSRQ).

5. The method of claim 1, wherein the acquisition of the second RAT comprises a handover to a BS of the second RAT.

6. The method of claim 1, further comprising maintaining uplink (UL) communications with the first RAT while obtaining the measurements.

7. An apparatus for wireless communications, comprising:
means for tuning away from a first radio access technology (RAT) to a second RAT during a first downlink time slot of a subframe of the first RAT, a frame boundary of the first RAT being aligned with a frame boundary of the second RAT;
means for obtaining measurements of downlink (DL) transmission from the second RAT including means for acquiring a primary synchronization signal (PSS), a secondary synchronization signal (SSS), and a physical broadcast channel (PBCH) of the second RAT;
means for tuning away from the second RAT to the first RAT before a transition from a last uplink time slot of the subframe of the first RAT to a second downlink time slot of the subframe of the first RAT; and
means for acquiring the second RAT based at least in part on the measurements.

8. The apparatus of claim 7, wherein the first RAT comprises Time Division Synchronous Code Division Multiple Access (TD-SCDMA).

9. The apparatus of claim 7, wherein the second RAT comprises Time Division Duplex Long Term Evolution (TDD-LTE).

10. The apparatus of claim 7, wherein upon acquiring the PSS, the SSS, and the PBCH, means for measuring a reference signal received power (RSRP) and a reference signal received quality (RSRQ).

11. The apparatus of claim 7, wherein the acquisition of the second RAT comprises a handover to a BS of the second RAT.

12. An apparatus for wireless communications, comprising:
at least one processor adapted to:
tune away from a first radio access technology (RAT) to a second RAT during a first downlink time slot of a subframe of the first RAT, a frame boundary of the first RAT being aligned with a frame boundary of the second RAT;
obtain measurements of downlink (DL) transmission from the second RAT including acquiring a primary synchronization signal (PSS), a secondary synchronization signal (SSS), and a physical broadcast channel (PBCH) of the second RAT;
tune away from the second RAT to the first RAT before a transition from a last uplink time slot of the subframe of the first RAT to a second downlink time slot of the subframe of the first RAT; and
acquire the second RAT based at least in part on the measurements; and
a memory coupled to the at least one processor.

13. The apparatus of claim 12, in which the at least one processor is further adapted to maintain uplink (UL) communications with the first RAT while obtaining the measurements.

14. The apparatus of claim 12, wherein the first RAT comprises Time Division Synchronous Code Division Multiple Access (TD-SCDMA).

15. The apparatus of claim 12, wherein the second RAT comprises Time Division Duplex Long Term Evolution (TDD-LTE).

16. The apparatus of claim 12, wherein upon acquiring the PSS, the SSS, and the PBCH, the at least one processor is adapted to measure a reference signal received power (RSRP) and a reference signal received quality (RSRQ).

17. The apparatus of claim 12, wherein the acquisition of the second RAT comprises a handover to a BS of the second RAT.

18. A computer-program product, comprising:
a non-transitory computer-readable medium comprising code for:
tuning away from a first radio access technology (RAT) to a second RAT during a first downlink time slot of a subframe of the first RAT, a frame boundary of the first RAT being aligned with a frame boundary of the second RAT;
obtaining measurements of downlink (DL) transmission from the second RAT including acquiring a primary synchronization signal (PSS), a secondary synchronization signal (SSS), and a physical broadcast channel (PBCH) of the second RAT;
tuning away from the second RAT to the first RAT before a transition from a last uplink time slot of the subframe of the first RAT to a second downlink time slot of the subframe of the first RAT; and
acquiring the second RAT based at least in part on the measurements.

19. The computer-program product of claim 18, wherein the first RAT comprises Time Division Synchronous Code Division Multiple Access (TD-SCDMA).

20. The computer-program product of claim 18, wherein the second RAT comprises Time Division Duplex Long Term Evolution (TDD-LTE).

21. The computer-program product of claim 18, wherein upon acquiring the PSS, the SSS, and the PBCH, code for measuring a reference signal received power (RSRP) and a reference signal received quality (RSRQ).

22. The computer-program product of claim 18, wherein the acquisition of the second RAT comprises a handover to a BS of the second RAT.

23. A method for wireless communications, comprising:
sending, from a base station (BS) of a first radio access technology (RAT), a command to a user equipment (UE), wherein the command instructs the UE to obtain measurements of downlink (DL) transmission from a BS of a second RAT including acquiring a primary synchronization signal (PSS), a secondary synchronization signal (SSS), and a physical broadcast channel (PBCH) of the second RAT, a frame boundary of the first RAT being aligned with a frame boundary of the second RAT;

allowing the UE to tune away from the second RAT to the first RAT during a first downlink time slot of a subframe of the first RAT;

maintaining uplink (UL) transmission with the UE while the UE obtains the measurements; and refraining from allocating traffic channels to the UE between a first downlink time slot of a subframe of the first RAT and a transition from a last uplink time slot of a subframe of the first RAT to a second downlink time slot of the subframe of the first RAT when the UE obtains measurements.

24. The method of claim 23, wherein the first RAT comprises Time Division Synchronous Code Division Multiple Access (TD-SCDMA).

25. The method of claim 23, wherein the second RAT comprises Time Division Duplex Long Term Evolution (TDD-LTE).

26. The method of claim 23, further comprising receiving a report of the measurements obtained by the UE to perform network acquisition operations of the UE to the BS of the second RAT.

27. The method of claim 26, wherein the network acquisition operations comprises a handover to the BS of the second RAT.

28. The method of claim 23, wherein the DL transmission from the BS of the second RAT is during the first time slot.

29. An apparatus for wireless communications, comprising:

means for sending, from a base station (BS) of a first radio access technology (RAT), a command to a user equipment (UE), wherein the command instructs the UE to obtain measurements of downlink (DL) transmission from a BS of a second RAT including acquiring a primary synchronization signal (PSS), a secondary synchronization signal (SSS), and a physical broadcast channel (PBCH) of the second RAT, a frame boundary of the first RAT being aligned with a frame boundary of the second RAT;

means for maintaining uplink (UL) transmission with the UE while the UE obtains the measurements; and means for refraining from allocating traffic channels to the UE between a first downlink time slot of the first RAT and a transition from a last uplink time slot of a subframe of the first RAT to a second downlink time slot of the subframe of the first RAT when the UE obtains measurements.

30. The apparatus of claim 29, wherein the first RAT comprises Time Division Synchronous Code Division Multiple Access (TD-SCDMA).

31. The apparatus of claim 29, wherein the second RAT comprises Time Division Duplex Long Term Evolution (TDD-LTE).

32. The apparatus of claim 29, further comprising means for receiving a report of the measurements obtained by the UE to perform network acquisition operations of the UE to the BS of the second RAT.

33. The apparatus of claim 32, wherein the network acquisition operations comprises a handover to the BS of the second RAT.

34. The apparatus of claim 29, wherein the DL transmission from the BS of the second RAT is during the first time slot.

35. An apparatus for wireless communications, comprising:

at least one processor adapted to:
send, from a base station (BS) of a first radio access technology (RAT), a command to a user equipment (UE), wherein the command instructs the UE to obtain measurements of downlink (DL) transmission from a BS of a second RAT including acquiring a primary synchronization signal (PSS), a secondary synchronization signal (SSS), and a physical broadcast channel (PBCH) of the second RAT, a frame boundary of the first RAT being aligned with a frame boundary of the second RAT;

maintain uplink (UL) transmission with the UE while the UE obtains the measurements;

refrain from allocating traffic channels to the UE between a first downlink time slot of a subframe of the first RAT and a transition from a last uplink time slot of a subframe of the first RAT to a second downlink time slot of the subframe of the first RAT when the UE obtains measurements; and a memory coupled to the at least one processor.

36. The apparatus of claim 35, wherein the first RAT comprises Time Division Synchronous Code Division Multiple Access (TD-SCDMA).

37. The apparatus of claim 35, wherein the second RAT comprises Time Division Duplex Long Term Evolution (TDD-LTE).

38. The apparatus of claim 35, wherein the at least one processor is adapted to receive a report of the measurements obtained by the UE to perform network acquisition operations of the UE to the BS of the second RAT.

39. The apparatus of claim 38, wherein the network acquisition operations comprises a handover to the BS of the second RAT.

40. The apparatus of claim 35, wherein the DL transmission from the BS of the second RAT is during the first time slot.

41. A computer-program product, comprising:

a non-transitory computer-readable medium comprising code for:
sending, from a base station (BS) of a first radio access technology (RAT), a command to a user equipment (UE), wherein the command instructs the UE to obtain measurements of downlink (DL) transmission from a BS of a second RAT including acquiring a primary synchronization signal (PSS), a secondary synchronization signal (SSS), and a physical broadcast channel (PBCH) of the second RAT, a frame boundary of the first RAT being aligned with a frame boundary of the second RAT;

maintaining uplink (UL) transmission with the UE while the UE obtains the measurements; and refraining from allocating traffic channels to the UE between a first downlink time slot of a subframe of the first RAT and a transition from a last uplink time slot of a subframe of the first RAT to a second downlink time slot of the subframe of the first RAT when the UE obtains measurements.

42. The computer-program product of claim 41, wherein the first RAT comprises Time Division Synchronous Code Division Multiple Access (TD-SCDMA).

43. The computer-program product of claim 41, wherein the second RAT comprises Time Division Duplex Long Term Evolution (TDD-LTE).

44. The computer-program product of claim 41, further comprising code for receiving a report of the measurements obtained by the UE to perform network acquisition operations of the UE to the BS of the second RAT.

45. The computer-program product of claim 44, wherein the network acquisition operations comprises a handover to the BS of the second RAT.

46. The computer-program product of claim 41, wherein the DL transmission from the BS of the second RAT is during the first time slot.

* * * * *